United States Patent [19]

Roe

[11] Patent Number: 4,678,402

[45] Date of Patent: Jul. 7, 1987

[54] VARIABLE PITCH PROPELLER

[76] Inventor: Homer D. Roe, 421 Biscayne Dr., Wilmington, N.C. 28405

[21] Appl. No.: 648,052

[22] Filed: Sep. 7, 1984

[51] Int. Cl.$^4$ .................................................. B64C 11/42
[52] U.S. Cl. .................................... 416/157 R; 416/154
[58] Field of Search .................... 416/156, 154, 157 R

[56] References Cited

U.S. PATENT DOCUMENTS

| | | | |
|---|---|---|---|
| 1,802,808 | 4/1931 | DeNarde | 416/157 |
| 1,803,858 | 5/1931 | MacClatchie | 416/156 |
| 2,609,057 | 9/1952 | Crowhurst | 416/154 |
| 2,889,888 | 6/1959 | Fairhurst | 416/156 |
| 3,219,121 | 11/1965 | Barden | 416/154 |
| 3,240,275 | 3/1966 | Bennett | 416/157 C X |
| 3,356,156 | 12/1967 | Reid | 416/157 |
| 3,600,102 | 8/1971 | Dirlik | 416/154 X |
| 3,746,466 | 7/1973 | Dallach et al. | 416/157 X |
| 4,037,986 | 7/1977 | Chilman | 416/154 X |

FOREIGN PATENT DOCUMENTS

| | | | |
|---|---|---|---|
| 301635 | 4/1920 | Fed. Rep. of Germany | 416/157 R |
| 748031 | 11/1944 | Fed. Rep. of Germany | 416/156 |
| 793323 | 1/1936 | France | 416/156 |
| 1141985 | 9/1957 | France | 416/157 R |
| 496038 | 11/1938 | United Kingdom | 416/157 R |
| 1588455 | 4/1981 | United Kingdom | 416/157 R |

*Primary Examiner*—Everette A. Powell, Jr.

[57] ABSTRACT

An impulse activated and controlled variable pitch propeller whereby the complete high pressure hydraulic system is incorporated in propeller hub assembly, including two identical type reciprocating hydraulic pumps which operate and control the propeller blade pitch settings by low force linear mechanical impulses transmitted from a remote stationary source through a pronged lever with input arm pivoting two anti-friction radial bearings attached to the pronged output ends for transmitting two equally balanced radial bearing contact forces in parallel on a rotating slidable flanged sleeve mounted on a propeller shaft adapter between the engine and the propeller, whereby said linear mechanical impulses are transmitted only during pitch change to actuate said pumps with the propeller otherwise free of any external mechanical contact during rotation.

3 Claims, 8 Drawing Figures

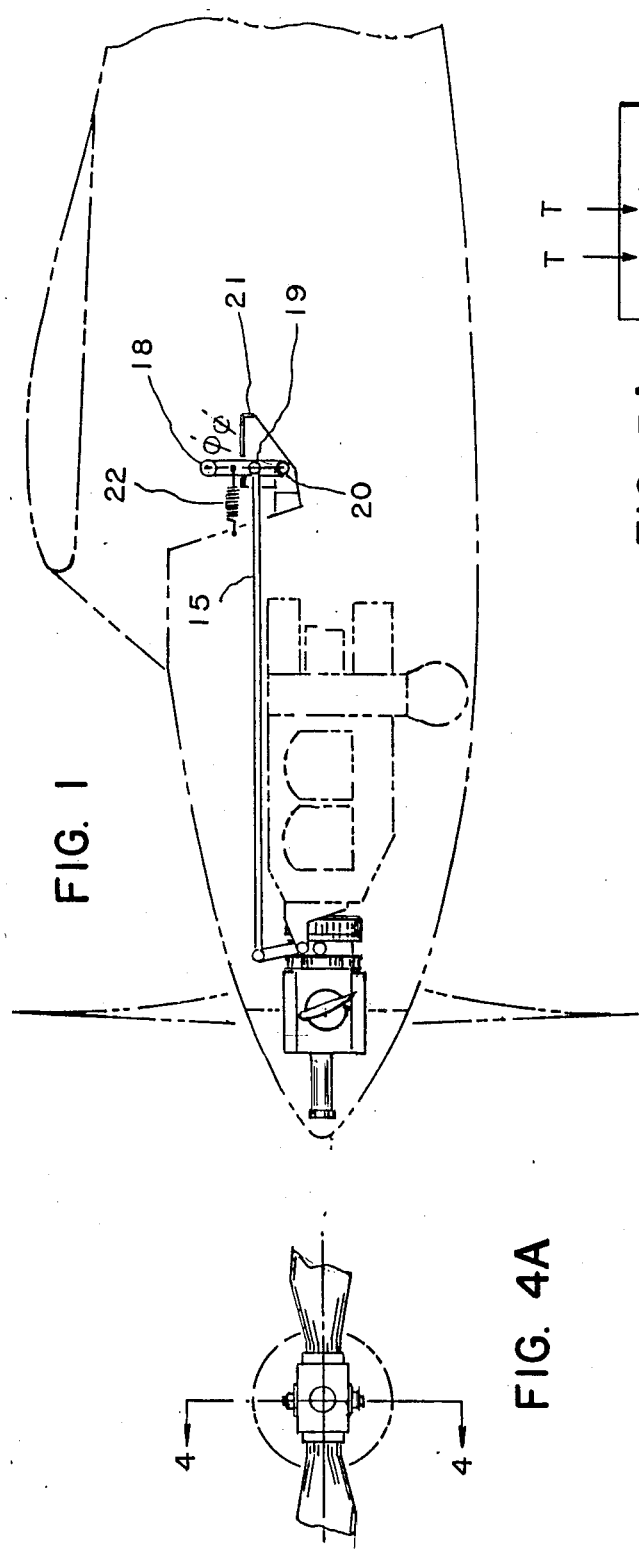
FIG. 1
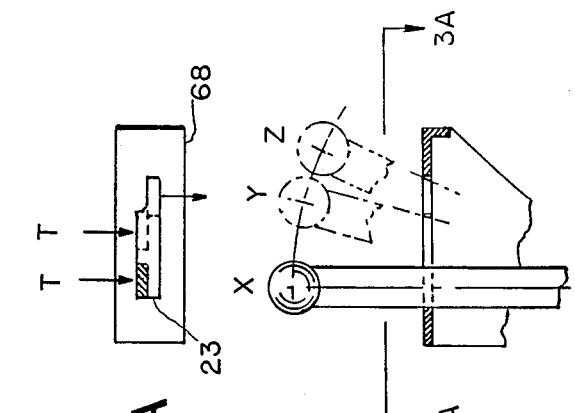
FIG. 3A
FIG. 3
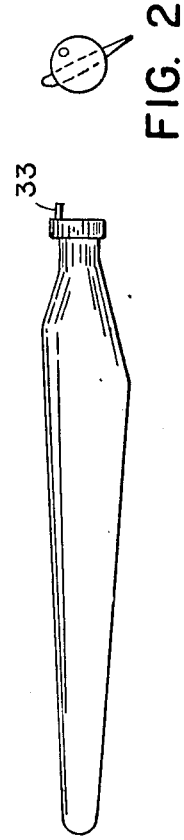
FIG. 2A
FIG. 2
FIG. 4A

VARIABLE PITCH PROPELLER

BACKGROUND OF THE INVENTION

Virtually all aircraft variable pitch propellers are of the constant speed type and are most commonly used for engine speed synchronization on multi-engined aircraft. Certain single-engined aircraft also use this propeller because of its availability but could otherwise use a simple variable pitch propeller.

To date, no hydraulically operated propeller has been developed to be as safe and practical as the foregoing constant speed type whereby engine oil is internally supplied through a special transfer bearing within the engine crankcase, then through a hollow bored propeller shaft to the propeller hub.

Hydraulic fluid transmitted from any external source through a rotating seal on the propeller shaft to the propeller hub is a gross misapplication due to continuous seal wearout, potential external leaking and pressure limiting characteristics.

Accordingly, the following mechanical impulse force method of powering and controlling a self-contained hub hydraulic system to operate the propeller is a simple and practical means of operating a propeller without external fluid connections and could be adapted to thousands of single-engined aircraft now not capable of modernizing such aircraft for improved performance.

SUMMARY OF THE INVENTION

This invention relates to hydraulically operated variable pitch propellers and/or variable pitch compressors and has for its object positive sealing means for the complete hydraulic high pressure 500 P.S.I. and above operating system to operate with low force level mechanical impulses and be contained within the propeller hub assembly incorporating static and intermittently activated reciprocating hydraulic seals powered by two identical performing hydraulic pumps with actuating plungers parallel to the propeller shaft and equidistantly spaced from the shaft centerline and aft from the hub face to receive equally balanced operating forces on a propeller shaft adapter slidable aft flange face and arranged to accept linear mechanical force impulses from the opposite face of said slidable flange by contact from anti-friction bearing mounted in a forked lever pivoted from a fixed base and actuated by mechanical forces from a remote source for power and control of said propeller.

Another object is the incorporation of the self-contained high pressure hydraulic system into the propeller hub assembly, thereby reducing system weight and improving reliability wherein externally connected hydraulics and rotating type seals are eliminated. Accordingly, the hub contained hydraulic system consists of two reciprocating positive displacement piston pumps to perform in an identical manner and therefore transmit equal and opposite impulse loads through the slidable flanged sleeve and while during each displacement producing continuous hydraulic reservoir venting and also on long impulse activation as means to reduce piston chamber pressure by cam activation of pressure balanced unloading valves as required to reduce blade pitch blade angle settings through spring biassing means. Dual piston pumps each operate independent check valves and are communicated to a common maximum pressure limiting relief valve and to the propeller blade piston actuating cylinder chamber. Pressure therein is lowered by long control impulse activations whereby the piston shaft engages one unloading valve seat in one pump assembly slightly before the same action occurs on the equally adjacent pump assembly to produce a two step sequential hydraulic bleed performance when desired. The two piston pumps being identical in form and weight are located diametrically opposed to assure dynamic balance on the hub.

Another object of this invention relates to propeller operating pitch control mechanism wherein a piston rod horizontally mounted on the propeller hub center line carrying a spring opposed piston in the hydraulic actuating cylinder dome nose is supported by fore, center, and after bulkhead bearings in the propeller hub and mounting a threadedly attached to a slotted pitch pin operating fork engaging mutually opposite propeller blade pitch driving pins and located between the center and aft bearing supports, said threaded fork so adjusted to locate the propeller pitch pins at low pitch when the dome piston is seated against an abutting piston stop and retained by a spring biassing compressive force to exceed any propeller blade resulting twisting moments toward high pitch blade positioning when hydraulic pressure on piston opposing spring biassing force is at its lowest set level; conversely, advancing from low pitch to high pitch is achieved when high pressure hydraulic pressure biasses various biassing spring force levels as required for intermediate and high pitch blade settings; should oil pressure be inadvertently lost, the propeller would fail safe to the low pitch stop.

A further object is for the slidable sleeve to receive linear mechanical impulse forces from a fixed airframe source by mechanical linkage consisting of tension acting control rods and bellcranks to activate an airframe mounted pivoted pronged lever assembly mounting two anti-friction sealed radial bearings on pronged ends to symmetrically and simultaneously bear rolling contact on the aft slidable sleeve flange face for transmitting balanced mechanical linear forces with minimal sliding friction through the flange face to activate the equally opposing hydraulic pump balanced forces in the hub hydraulic system.

It is a further object in the propeller hub assembly to incorporate attaching means for a slidable sleeve propeller shaft adapter assembly between the propeller hub assembly and the engine propeller flange.

It is still a further object for the propeller shaft adapter to mount a freely slidable flanged sleeve component indexed to prevent rotation thereon to slidably transmit reciprocating impulse forces applied from an airframe origin to simultaneously actuate two hydraulic pump plungers in the propeller hub to produce hydraulic system power and control functions.

A still further object is to provide a definite contact clearance between the pivoted pronged lever anti-friction roller bearings and the aft slidable sleeve flange face to prevent unnecessary bearing wear and eliminating any mechanical contact with the rotating propeller when not deliberately transmitting mechanical control functions.

Another object is to provide a fixed operating quadrant in the airframe to actuate and control the propeller by a pivoted lever arranged to reciprocate in a manner to transmit mechanical forces through a control rod in tension only and otherwise be spring retained against a lever stop and rigged to assure clearances on the interface slidable flange when not carrying said linear force loads.

Another object on the operating control quadrant is means for normal linear stroke oscillation to be set for increasing propeller pitch and the need for latch resetting be required for longer linear stroke oscillations required for decreasing propeller pitch.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF DRAWINGS

FIG. 1 is an inboard profile showing an Impulse Actuated Variable Pitch Propeller installed on a single engine airplane.

FIG. 2 is a typical propeller blade and pitch drive pin in blade profile and butt end view.

FIG. 2A is an end view of FIG. 2.

FIG. 3 is the propeller control quadrant designating the control actuating modes.

FIG. 3A is a plan view of FIG. 3 of the control quadrant illustrating control stops and side force direction applied to achieve the operating modes.

FIG. 4A is a front view of the propeller.

DESCRIPTION OF THE PREFERRED EMBODIMENT

Figure 4:
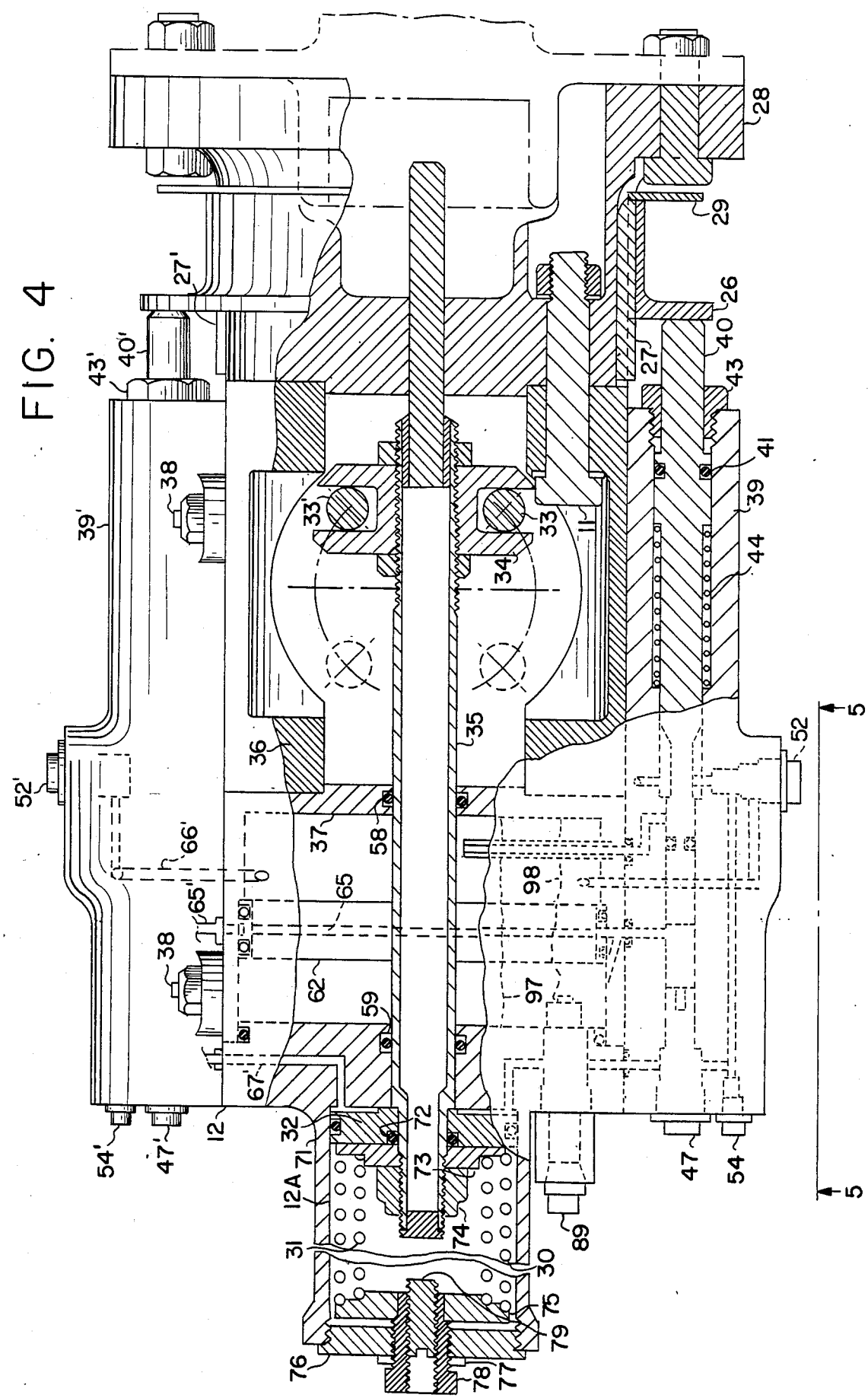
FIG. 4 is a ¾ sectional view of the impulse actuated variable pitch propeller hub assembly, including typical blade actuating components, also hub adapter with slidable flanged sleeve components and hub assembly side elevation views of hydraulic components.
Figure 5:
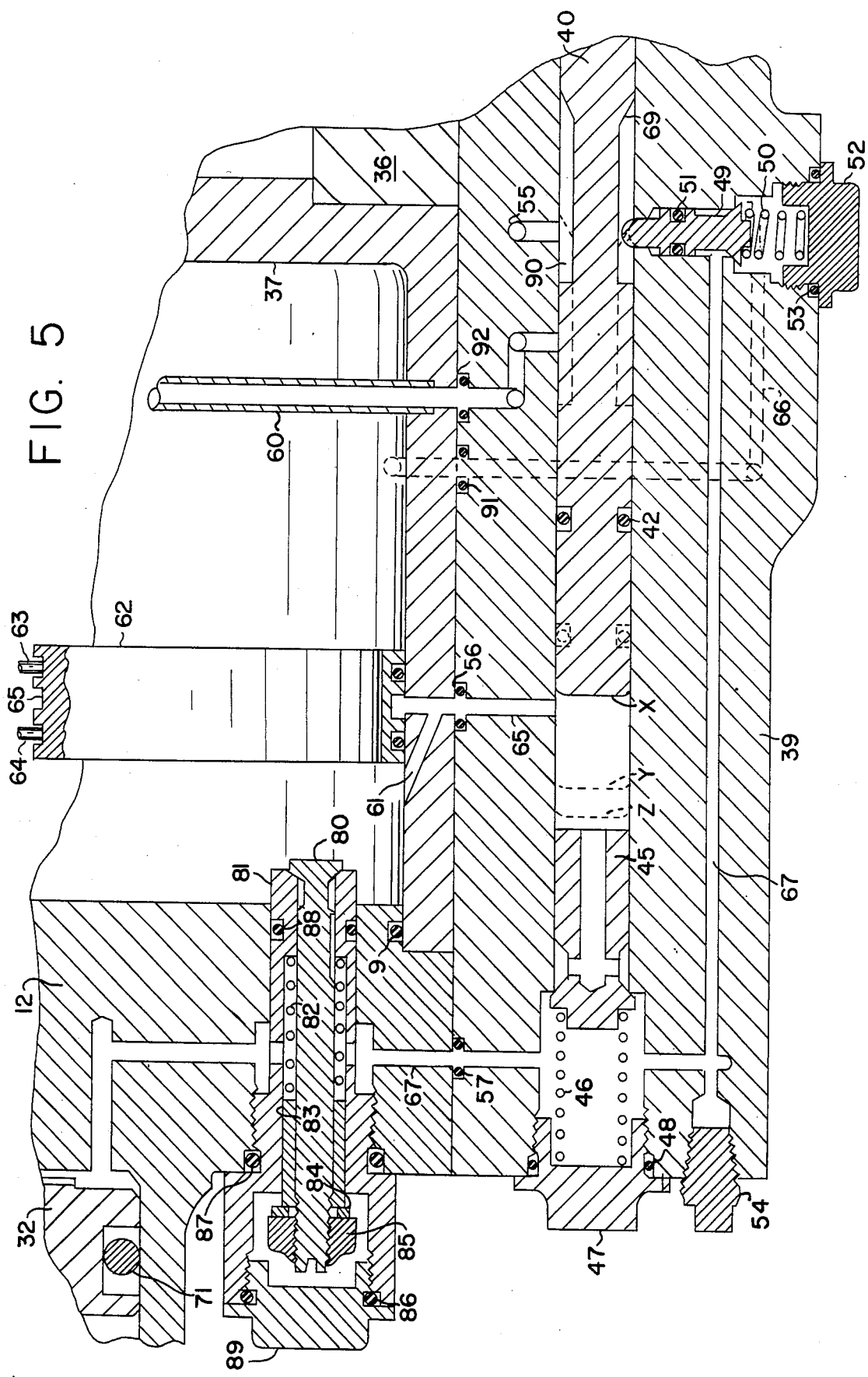
FIG. 5 is a sectional side view of hydraulic components and operating positions of control and vent system components.
Figure 6:
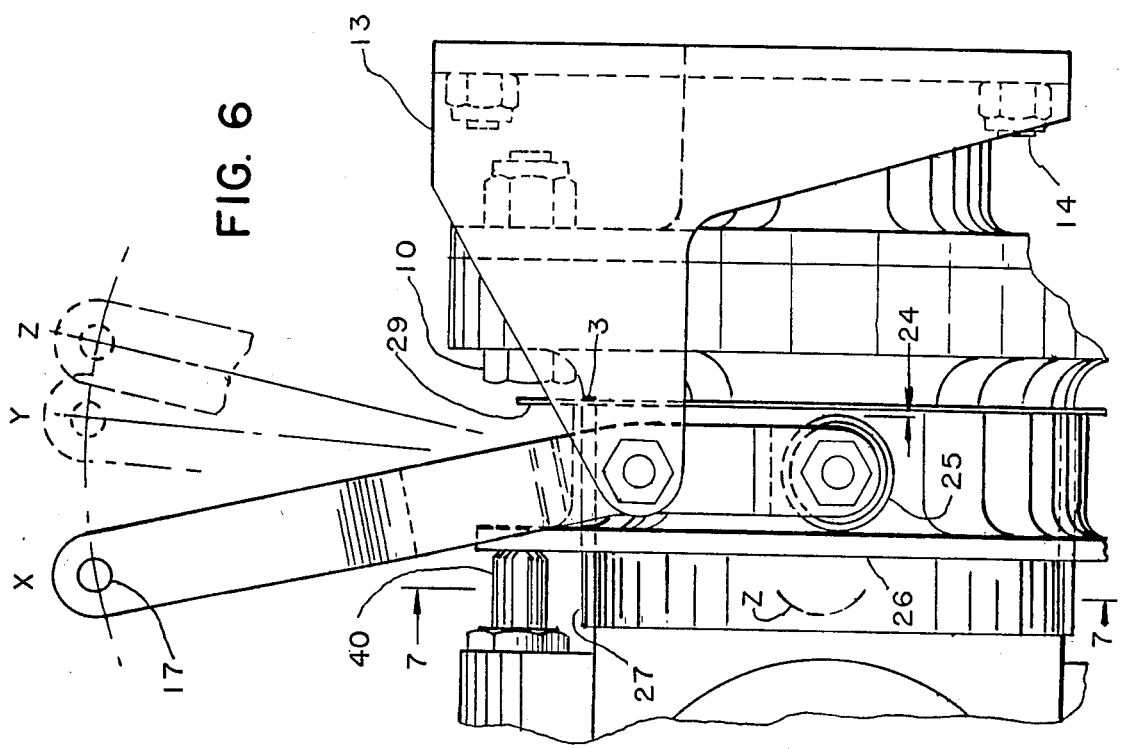
FIG. 6 is a side elevation of propeller shaft adapter with pronged lever assembly and slidable sleeve mounted between the engine and hub assembly showing airframe mounting bracket, operating lever control and operating positions.
Figure 7:
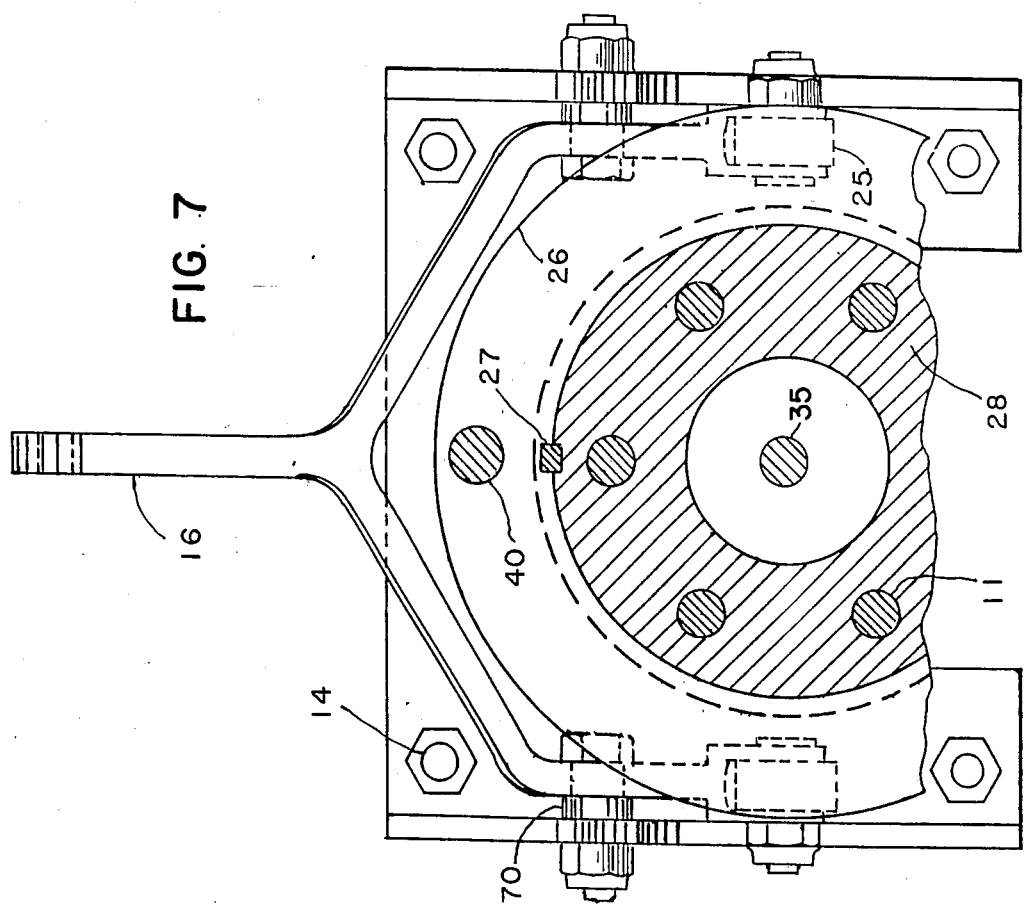
FIG. 7 is a sectional view of FIG. 6 through the propeller hub adapter and mounting of the pronged lever assembly with slidable sleeve and sectioned piston pump rod.

Referring to the drawings in detail, FIG. 4 is a variable pitch hydraulic propeller assembly 36 with blades mounted with suitable blade retention and pitch rotation means by pins 33 carried through angular pitch rotation by fork 34 threadedly attached to piston shaft 35 and activated by hydraulic fluid pressure in passage 67 and 67' energized by pump pistons 40 acting simultaneously in pumps 39 and 39' and pressure secured in FIG. 5 by check valves 45 and pressure sensored by relief valve 80 also acting upon FIG. 4 piston 32 which is retained on piston shaft 35 by washer 73 and lock nut 74. In FIG. 1 when incremental blade settings are made, mechanical linear forces are transmitted by tension rod 15 from the stationary fixed base operating handle 18 pivoting on fulcrum 20 and imposed on fixed base lever 16 FIG. 7 at rod connection 17 FIG. 6 through operating stroke lengths of X, Y and Z displacements, also said FIG. 6 lever 16 pivots about axis 70 carrying pronged bearings 25 in rolling contact on aft flange face of slidable sleeve 26, which is slidably mounted on FIG. 7 propeller shaft adapter 28 and engaged to rotate with said shaft by keyseated engagement of keys 27 and 27'. Said slidable sleeve 26 when not acted upon by mechanical linear forces is normally seated by FIG. 6 abutting flange 29 at seat 3 providing bearing clearance 24 by hydraulic pump plungers 40 and 40' being thrust upon slidable sleeve 26 front face by FIG. 4 pump springs 44 simultaneously, and providing mechanical FIG. 6 clearance 24 during non-application of linear forces. At FIG. 1, handle operation of lever 18 through FIG. 3 quadrant arc X and Y to increase blade angle settings, is performed by the transmitting of said linear forces from FIG. 7 lever 16 by FIG. 6 pivoting bearings 25 in equal force rolling contact with flange 26 and thrusting equal force distribution through flange and bearing on both hydraulic pump rods 40 and 40' simultaneously, producing hydraulic pump activation. Said pump activations permit reservoir fluid FIG. 4 at 98 level to be admitted through FIG. 5 passage 61 to be simultaneously distributed channels 65 and 65' through transfer ring 62 to both pumps on suction stroke and being pressurized, passing through check valves 45 and 45' to said channels 67 and 67' behind FIG. 4 actuator piston 32 in dome housing 12A when piston is in various pitch sector positions resulting in dominant pump hydraulic pressures exceeding spring biassing force thrust components of said springs 30 and 31 retained in dome cavity 12A by retainer 76. In FIG. 4, upon various pressure increases from activation, whereby said increase resulting thrust force on piston 32 exceeds biassed force of springs 30 and 31, piston rod 35 is piloted through dome housing 12, reservoir housing bearing 37, and bearing in adapter 28 and sealed through bearings in housing 12, by seal 59 and housing 37, by seal 58. Seal 72 is sealing means for piston 32 on piston rod 35 and piston gland seal 71 seals piston 32 to housing 12A. Full piston rod displacement to full high pitch is limited to adjustable stop abutting means 79 and limited to over-pressure engagement on said stop by FIG. 5 pressure limiting relief valve 80. Said valve provided with threaded adjustment means on valve stem nut 85 washer 84 resetting spring biassing force on spring 82 contained in housing 81 by spacer 83. Said relief valve sealed in housing 12 by seals 87 and 88 and under valve adjusting cap 89 by seal 86.

Actuation of propeller for resetting propeller blade angle settings to low pitch is accomplished by actuating linear thrust impulses on the control quadrant for operation in the long linear stroke displacement by applying side thrust on the FIG. 3A quadrant in the "T" indicated range during actuation in the X-Y sector to engage slot in the final third stroke arc Y-Z range, whereby the FIG. 5 piston rods 40 incorporate a relieved diameter 90 for normal short shaft X-Y displacements and incorporating an inclined ramp cam acting profile 69 to engage a pressure balanced valve tappet stem 49 in the Y-Z range. Upon said engagement, and by various displacements of long piston rod engagements Y-Z, hydraulic fluid is bypassed from fluid passage 67 communication to piston actuator chamber thereby reducing hydraulic force against piston whereby resetting to mechanical spring biassing means occurs to reduce blade pitch setting maintaining equalibrium in actuator forces, etc. Hydraulic fluid released from actuator in the foregoing cycle is communicated through passages 67 and 67' into the inlet bleed chamber of fluid balanced valve 49 and discharged through passages 66 and 66'. Valve 49 is reset by mechanical spring 50 force after each operating cycle during said retreating piston rod displacements.

The hydraulic FIG. 4 reservoir is contained in a closed cylindrical volume symmetrically embracing the piston rod and seals 9, 58 and 59 defined by the internal bore of center bearing housing 37 and forward hub cap 12. Reservoir filling is accomplished by removing pressure reducing cap 52'. Reservoir venting in FIG. 5 is maintained by the unporting of vent standpipe 60 orifice by the piston 40 in 39 housing body into piston rod 40 formed cavity 90 and to the atmosphere through external port 55 during each normal X-Y or Y-Z operating piston activation.

Hydraulic system maintenance includes removal of hydraulic pumps and/or removal of each or all separate components without removal of the propeller from the aircraft.

I claim:

1. In combination with a propeller including a hub with blades, each mounted for rotatable retention and pitch adjustment in said hub having complete hydraulic system control means with components symmetrically arranged therein for effecting pitch adjustment of said blades with an actuator and connecting means for operably connecting the actuator to the blades, said actuator urgeable by spring biassing means in one direction for adjusting pitch to low blade angles and being subjectable to fluid pressure for movement in the opposite direction against the action of the biassing means for adjusting pitch to high blade angles, said fluid pressure produced by two identical performing reciprocating hydraulic pumps mounted parallel to the hub rotating axis and symmetrically offset thereof, said hub providing attaching means for a propeller shaft adapter on said hub rotating axis for mounting a flanged slidable sleeve keyseated on the adapter preventing relative rotational movement thereon with axial freedom and in equal bearing contact on forward flange face with two hydraulic operating pump plungers, each urged in outward thrust when normally seated by internal pump piston actuating spring biassing force on slidable sleeve stop means or conversely when transmitting incoming operational linear mechanical forces to overcome pump spring set biassed forces which are likewise equally applied to the hydraulic pumps about the hub rotating axis, when such forces are engaged by anti-friction bearing contact on aft slidable sleeve flange surface and in operating contact therewith, also said operational forces acting from a fixed base secured bracket with pivoting lever axis supporting a two-pronged lever, each prong attaching a radial bearing whereby said bearings being located to act horizontally in planes parallel to and symmetrically spaced about the propeller shaft center line and centered in the vertical sense on the propeller shaft center line, said operating force lever when connected to fixed base operating means whereas from the null or forwardmost position on the pronged operating lever arm exists a positive radial bearing contact clearance as required in the control rigging to prevent unwanted linear forces being transmitted to flange slidable sleeve; however, when powering to control propeller for pitch increase, said power activation is applied by impulses not to exceed the first two-thirds of the pump total stroke displacement to obtain such settings whereby increasing hydraulic pressure on said blade actuator is used for movement against the action of actuator spring biassing means; conversely, reduction of blade pitch angle change is obtained by applying various long impulse strokes which are effective during the final third of total impulse pump stroke displacement limits, whereby pump piston rods in said pump body mechanically activates the pressure unloading valves, thereby reducing hydraulic pressure acting against said biassing spring force means for reducing blade pitch angle change, and inaction of said control impulses at all hydraulic pressure levels conditions all fluid seals in the hydraulic system in the positive static sealing mode to effect blade pitch locking.

2. In combination with a propeller as defined in claim 1 wherein the complete hydraulic system for operating and controlling said propeller is capable of high working pressure by low force linear mechanical activation with all static fluid sealing means in the rotating hub whereby after each blade adjustment impulse the propeller is fee of non-rotating connections and remains in a pitch-locked state infinitely while the propeller is in the rotating or non-rotating mode.

3. In combination with the propeller as defined in claim 1 whereby said operating and control linear mechanical forces are received from a remote stationary source operating quadrant devised with latching means for selecting either long or short tension control rod displacements when actuated from a quadrant lever stop retained position and actuated by manual force acting on quadrant handle overcoming spring biassing means during tension rod displacements when connected to said lever pivoted prong assembly mounting two anti-friction roller bearing on prong ends whereby said bearings transmit said mechanical linear forces only upon lever actuation in simultaneous roller bearing contact on propeller adapter shaft slidable sleeve for actuating two hub hydraulic system pumps.

* * * * *